US006709777B2

United States Patent
Hagans et al.

(12) United States Patent
(10) Patent No.: US 6,709,777 B2
(45) Date of Patent: Mar. 23, 2004

(54) PERFORMANCE RECOVERY PROCESS FOR PEM FUEL CELLS

(75) Inventors: Patrick L. Hagans, Columbia, CT (US); Gennady Resnick, South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 58 days.

(21) Appl. No.: 10/103,584

(22) Filed: Mar. 20, 2002

(65) Prior Publication Data

US 2003/0180586 A1 Sep. 25, 2003

(51) Int. Cl.[7] .............................................. H01M 8/00
(52) U.S. Cl. ............................. 429/13; 429/14; 429/17
(58) Field of Search ............................... 429/13, 14, 17

(56) References Cited

U.S. PATENT DOCUMENTS 5,470,669 A * 11/1995 Ludwig et al. ............... 429/17
6,149,810 A * 11/2000 Gonzalez-Martin et al. ..... 210/321.84
2002/0031695 A1 * 3/2002 Smotkin ..................... 429/30

* cited by examiner

*Primary Examiner*—Patrick Ryan
*Assistant Examiner*—Dah-Wei Yuan
(74) *Attorney, Agent, or Firm*—M. P. Williams

(57) ABSTRACT

Recovery of PEM fuel cell performance is achieved by evacuating (61, 62) or by flowing water absorbing gas (46) through, or both, the fuel flow field (12, 13, 19, 20), the air flow field (25, 26, 30, 31), and the water flow field (36, 39), while resistance of the individual cells, or of the fuel cell stack, is measured; the dry out process is continued until the resistance of the cells (or the resistance per cell, measured across the fuel cell stack as a whole), has increased by at least 5 to 1 (preferably 10 to 1) over the normal resistance of the cells. The water absorbing gas may be air (23) or nitrogen (47); it may be at ambient temperature or heated (50).

18 Claims, 3 Drawing Sheets

PERFORMANCE RECOVERY PROCESS FOR PEM FUEL CELLS

TECHNICAL FIELD

This invention relates to restoring performance of PEM fuel cells after performance loss due, for instance, to freeze/thaw cycles and/or "boot strap" startup of frozen fuel cells.

BACKGROUND ART

In U.S. Pat. No. 4,294,892, the regeneration or recovery of a fuel cell (restoring the fuel cell to full performance following a loss of performance) is accomplished by reducing the concentration of oxygen on the cathode while maintaining the overall pressure of gas in the cathode oxidant reactant flow fields, either by replacing oxygen with a flow of argon or by shutting off the air discharge. The terminal voltage is preferably reduced to 10% of its original value. Other known methods of regenerating a fuel cell include reducing or stopping the flow of air and substituting a flow of inert gas for the oxidant flow. In most cases, fuel flow continues so as to react with and thereby remove oxygen from the system. In some cases, the load remains connected and in other cases an auxiliary load is substituted for the principal load.

A known method of regenerating the performance of a fuel cell called "hydrogen pumping" is disclosed in U.S. patent application Ser. No. 09/602,361, filed Jun. 22, 2000. The load is disconnected from the fuel cell stack and a reverse-polarity power supply is connected across the fuel cell stack output. Then, hydrogen is flowed through both the anode and cathode flow fields. This causes hydrogen ions, or protons, or hydronium ions to flow from the cathode to the anode, and reduces the cathode potential, typically, to below 0.1 volts. The flow of hydronium ions from the cathode to the anode transfers water from the cathode to the anode and is referred to as proton drag. The process is continued until it is known that the fuel cell stack will revert to normal performance when normal operation of the fuel cell stack resumes. In another embodiment, the air is replaced by inert gas with the fuel cell stack output being open circuited (no load). Increasing current may also be used to help reduce the voltage across the cells and to help regenerate performance.

The use of fuel cell power plants in vehicles require that they be operable in ambient temperatures as low as −30° C. and that they be capable of startup in several minutes or less. One method of starting a frozen fuel cell is supplying hydrogen and air to the anodes and cathodes, respectively, and to immediately draw electricity from the fuel cell, with the normal fuel cell coolant being diverted around the fuel cell. This is called a "boot strap start". The waste heat produced within the cell, as a by-product of the fuel cell reactions, causes the stack temperature to rise very quickly. However, repetitive use of this procedure has been found to reduce fuel cell stack performance in substantially the same fashion as repetitive freeze/thaw cycles.

DISCLOSURE OF INVENTION

Objects of the invention include restoration of performance to fuel cell stacks following loss of performance such as from repetitive freeze/thaw cycles or repetitive boot strap start-up cycles; a fuel cell stack regeneration process which can be monitored for effectiveness; and an improved process for restoring fuel cell stack performance.

It is known that the resistance of a proton exchange membrane, such as a perfluorosulfonic acid membrane frequently used in PEM fuel cells, increases as the water content of the membrane is reduced. This invention is predicated on the discovery that partially drying out the nano pores present in the proton exchange membrane, or in the ionomer of the catalyst layer adjacent to the membrane, will substantially restore fuel cell performance.

According to the present invention, the performance of a fuel cell stack is recovered by drying out the fuel cells to the point where the resistance across each cell has increased significantly, such as at least by 5 to 1, and preferably by 10 to 1, over the normal resistance of the cell. In accordance with the invention, water is evaporated from all of the macro pores (pores that are greater than about 100–200 nanometers in diameter or larger) in the cell structure, including pores in the water transport plates if present, the substrates, the diffusion layers, and the catalyst layers. With all of the water evaporated from the macro pores, the micro pores present in the proton exchange membrane or in the ionomer within the catalyst layer (which may be approximately four nanometers in diameter) are partially dried out. Completion of dry out is determined by measuring the resistance of the fuel cells. The resistance can be measured across each cell individually, or, in an otherwise properly constructed fuel cell stack in good condition, resistance can be measured collectively, across the entire fuel cell stack.

In accordance with the present invention, a water absorbing gas is flowed into at least one of: (1) the fuel reactant gas flow fields, (2) the oxidant reactant flow fields, and the (3) water management flow fields (if any) of all of the fuel cells. In some cell constructions, the water flow fields also function as coolant flow fields. The water absorbing gas may be ambient air, nitrogen or other inert gas, or any other gas which absorbs water suitably and is otherwise not adverse to the conditions and process involved. The gas may be at ambient or elevated temperature. The gas may be at ambient pressure or pressurized.

According further to the present invention, water is removed from a fuel cell by evacuating at least one of: (1) the fuel reactant gas flow fields, (2) the oxidant reactant flow fields, and (3) the water management flow fields (if any) of all the fuel cells. In accordance further with the present invention, one or more of the flow fields may be evacuated contemporaneously with providing a water absorbing gas to such flow fields.

The present invention not only provides processes which restore fuel cell performance lost either as a result of repetitive freezing or repetitive use of boot strap start-ups, but it does so in a way that can be monitored by means of resistance so that it is known when the process is complete and will be successful.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
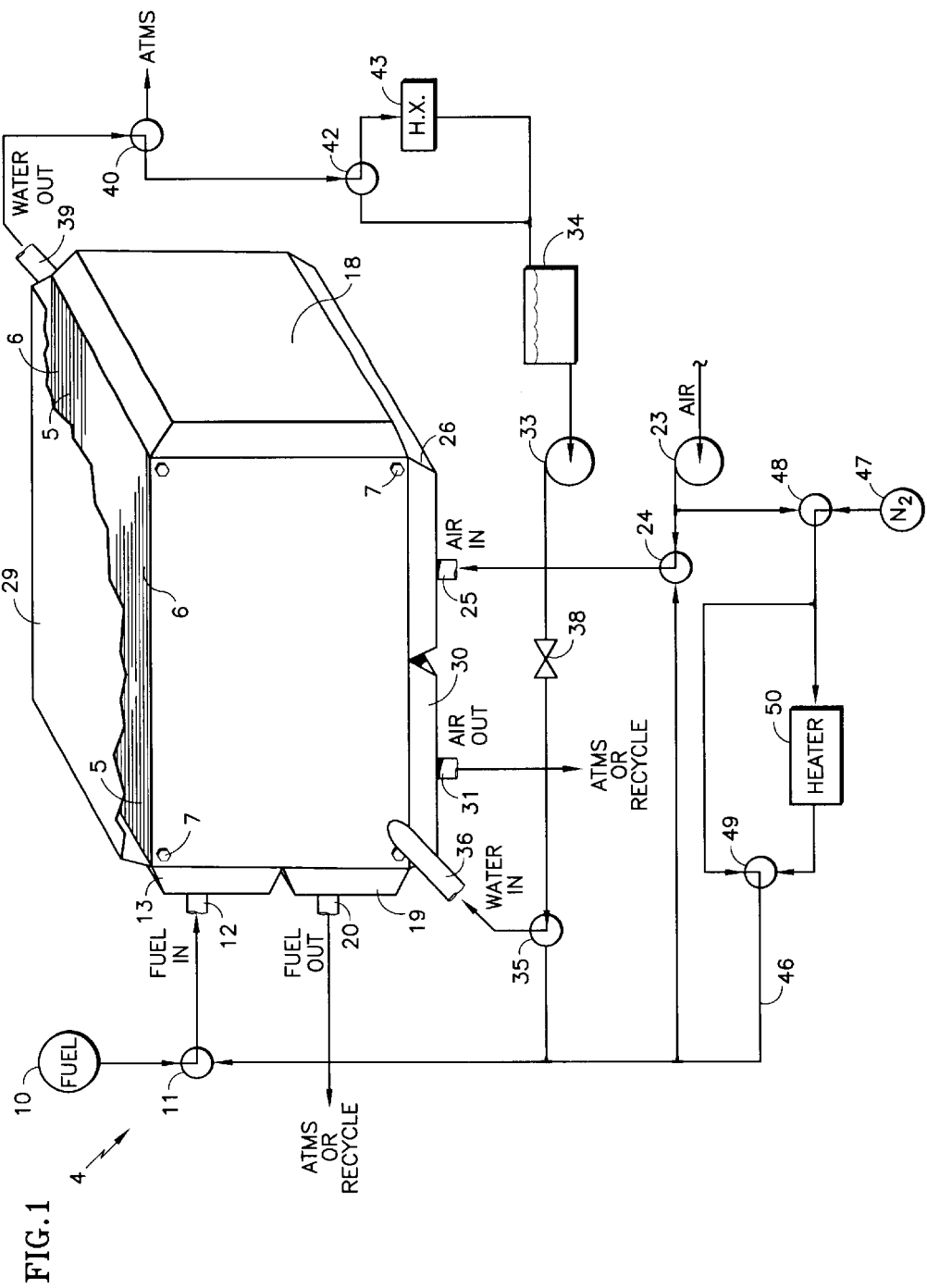
FIG. 1 is a simplified perspective view of a fuel cell with apparatus for normal operation and for recovering performance in accordance with a first aspect of the present invention.

Referring to FIG. 1, a fuel cell stack 4 comprises a plurality of fuel cells 5 clamped together between pressure plates 6 by bolts 7. Fuel is supplied to the stack 4 from a source 10 through a valve 11, shown in its normal operating position, a fuel inlet 12 and a fuel inlet manifold 13. The fuel flows through the upper halves of the cells 5, to the right as seen in FIG. 1, and is turned around in a manifold 18, after which it flows through the lower half of the cells, to the left as seen in FIG. 1, to a fuel outlet manifold 19 from whence it flows through a fuel outlet 20 either to atmosphere or to some form of known fuel recycle loop (not shown).

In the example of FIG. 1, the oxidant is air, drawn from the atmosphere by a pump 23, which then flows through a valve 24, shown in its normal operating position, through an air inlet 25 to an air inlet manifold 26. The fuel flows upwardly (as seen in FIG. 1) in the right half of the fuel cells 5, is turned around within a manifold 29 and then flows downwardly (as seen in FIG. 1) through the left half of the fuel cells 5, through an air outlet manifold 30 at air outlet 31, either to atmosphere or to a water recovery device, as may be desired.

In the embodiment of FIG. 1, water is provided by a pump 33 from a reservoir 34, through a pressure regulator 38, which allows the pressure of the water flow fields to be below that of the fuel and air flow fields, through a valve 35, shown in its normal operating position, to a water inlet 38. In the embodiment of FIG. 1, an internal water inlet manifold comprises holes which pass through each of the fuel cells, from front to back as viewed in FIG. 1, with passages to allow water to flow into the water management flow fields of the fuel cells, which are in fluid communication with the fuel and air and/or air flow fields. Similarly, a water outlet manifold comprises holes passing through all of the fuel cells from front to back, with passageways to receive water from each fuel cell, the internal water outlet manifold terminates at a water outlet 39. The water then passes through a valve 40, shown in its normal operating position, a valve 42, shown in its normal operating position, a heat exchanger 43, for cooling the water, and thence back to the water reservoir 34. The reservoir 34 may have a water outlet, as is known, if desired (not shown).

This invention is also applicable to fuel cell stacks which use solid coolers which are not in fluid communication with the reactant flow fields. Such solid coolers might contain an antifreeze solution; the antifreeze may be heated to quicken the dry out process. But the invention does not involve drying out coolant channels which are isolated from the reactant gas flow fields.

Examples of fuel cells with which the invention may be used are found in U.S. Pat. Nos. 5,503,944, 5,840,414, 6,020,083 and 6,024,848.

Before the dry out process of the invention can be performed by flowing a water absorbing gas through one or more flow fields, the cells must be drained, which may be achieved using a suitable process, such as, for example, that disclosed in commonly owned copending U.S. patent application Ser. No. 09/826,739, filed Apr. 5, 2001.

To perform one procedure of the present invention to recover fuel cell performance, such as after multiple freezes, multiple boot strap starts, or other performance degrading activity, the valve 11 will be rotated one-quarter turn clockwise and the valves 24 and 35 will be rotated one-quarter turn counterclockwise, thereby to provide a water absorbing gas from a line 46 to the fuel inlet 12, the water inlet 36, and the air inlet 25. The valve 40 will be rotated one-quarter turn clockwise to vent the water flow field. As shown in FIG. 1, the water absorbing gas in the line 46 is nitrogen from a source 47 which is passed through a pair of valves 48 and 49, thereby to bypass a heater 50. The water absorbing gas in the line 46 heated up to about 100° C. may be utilized by rotating the valve 49 one-quarter turn counterclockwise, in which case the time required to achieve the purposes of the present invention will be reduced below that described hereinafter. Ambient or room temperature nitrogen may be used, by causing the valve 49 to remain in the position shown. If it is preferred to use air, rather than nitrogen, the valve 48 may be turned one-quarter turn clockwise so that the water absorbing gas in the line 46 is derived from the air pump 23 instead of from the nitrogen source 47. If desired, other gases capable of absorbing water may be used in place of air or nitrogen. It is not necessary to flow the water absorbing gas through each of the fuel, oxidant and water management flow fields (if any), but it is preferred to do so because it is faster. In fuel cell stacks containing solid coolers, the coolant may be heated and passed through the stack to hasten the process of drying out the fuel cells.

Figure 2:
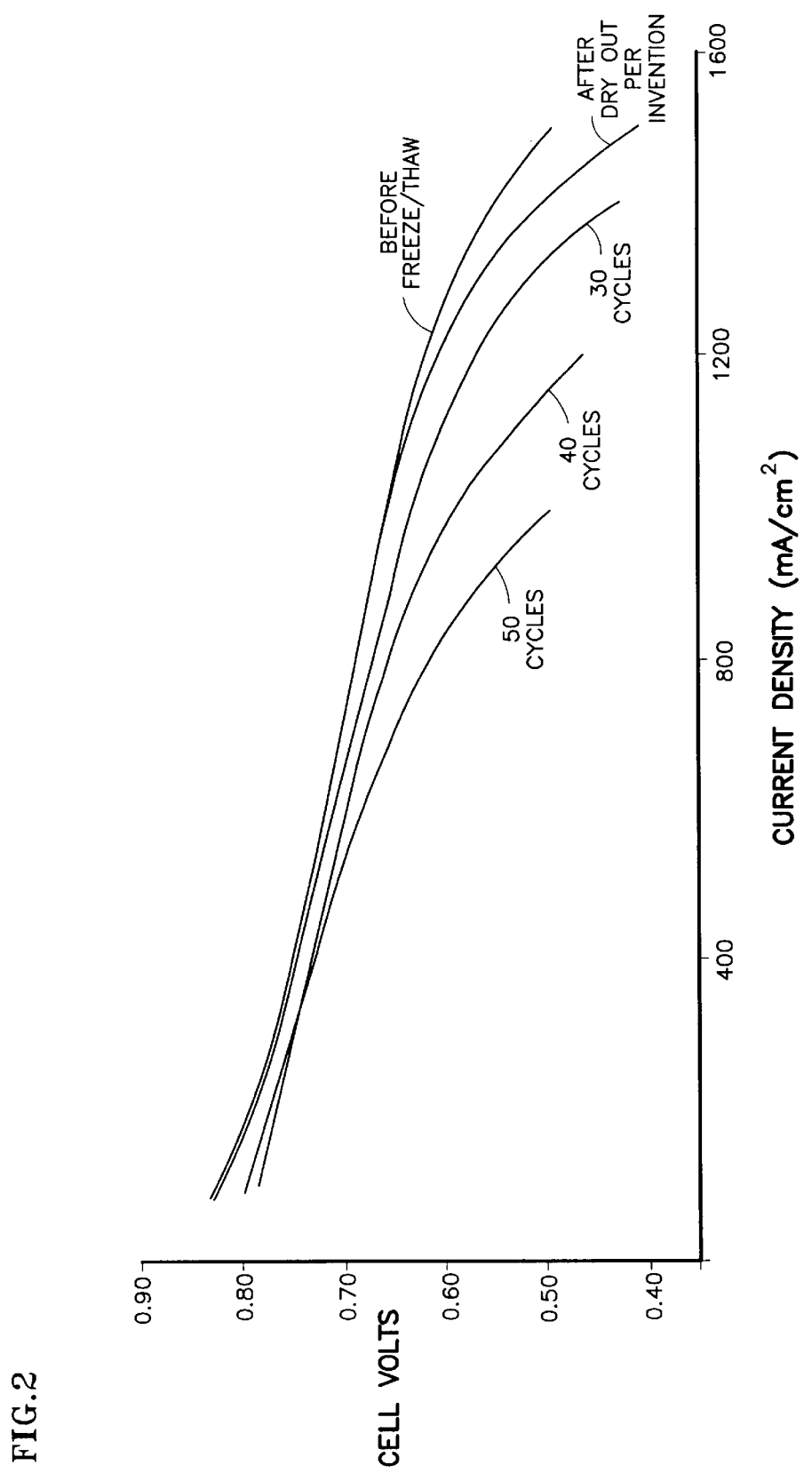
FIG. 2 is a performance chart of a fuel cell following freeze/thaw cycles and after regeneration in accordance with the invention.

In FIG. 2, the deterioration of performance of an individual fuel cell is shown after 30, 40 and 50 freeze/thaw cycles, each freeze cycle being to −30° C. The fuel cell had an active area of 0.4 square feet, a Gore 5561 membrane electrode assembly with wettable cathode and anode substrates, no diffusion layer on the anode substrate, a 25 micron, 10% Teflon diffusion layer on the cathode substrate, and both anode and cathode water transport plates. The fuel cell was operated with 80% utilization of substantially pure hydrogen and 60% utilization of ambient air, at 65° C. temperature. The dry out in accordance with the present invention was achieved with room temperature nitrogen (valves 48 and 49 being as shown in FIG. 1) at a flow rate of 4 liters per minute for each of the fuel, oxidant and coolant flow fields, for a total flow of 12 liters per minute. After 50 freeze/thaw cycles, the cell resistance was 0.05 milliohms as tested with a 1 kilohertz milliohm meter. After performing the dry out procedure for on the order of 20 hours, the cell resistance had increased to 27 milliohms. After the dry out procedure of the present invention was completed, the cells were refilled by flowing water through the manifolds from the water inlet 36 to the water outlet 39 and allowing adequate time for the water to wick into the other cell components, in a normal fashion. The cell performance was restored to substantially the pre-freeze performance.

A similar fuel cell was subjected to multiple boot strap startups, beginning at −5° C. and ending at 0° C. After 10 boot strap startups, performance had decayed significantly. The cell was then dried out, in accordance with the invention, for about 25 hours and the cell resistance increased from 0.32 milliohms to 4.7 milliohms. Performance then was nearly equivalent to the initial performance (prior to the boot strap startups).

A fuel cell stack comprising 20 cells generally of the type described hereinbefore was subjected to a drain procedure to remove water from the water flow channels in the water transport plates as well as to remove water from the coolant manifolds in the cell stack assembly. This drain procedure was similar to that described in the aforementioned patent application Ser. No. 09/826,739. After being drained, the fuel cell stack was cooled to −20° C. It was subsequently allowed to thaw at room temperature. The sequence was repeated for a total of three freeze/thaw cycles and the cell performance was measured. The performance tests showed that cells 1–5 had lost considerable performance as a result of the three freeze/thaw cycles. In the fuel cell stack, the water inlet and water outlet were on the same face of the fuel cell stack, and the five cells referred to in the Table were the farthest cells from the water inlet and the water outlet, giving rise to the likelihood of them not being fully drained before freezing. The fuel cell stack was then subjected to a dry out procedure of the present invention using room temperature nitrogen flow, with the resistance of each individual cell increasing from within a range of between 0.15 milliohms and 0.20 milliohms to a range of between 0.8 milliohms and 2.7 milliohms. As used herein, the term "resistance of each fuel cell" means either the actual resistance of each fuel cell measured separately, or the resistance per cell of the fuel cell stack. Thereafter, the performance of cells 1–5 were similar to the performance of the remaining cells of the stack. The individual cell voltages at 800 amps per square foot are as set forth in the following Table:

|  | Cell Voltage | | |
| --- | --- | --- | --- |
|  | Before Freezing | After Three Freeze Cycles | After Dry out Per Invention |
| Cell 1 | 0.670 | 0.544 | 0.650 |
| Cell 2 | 0.678 | 0.580 | 0.660 |
| Cell 3 | 0.672 | 0.542 | 0.655 |
| Cell 4 | 0.682 | 0.661 | 0.663 |
| Cell 5 | 0.674 | 0.615 | 0.658 |
| Average Cells | | | |
| 6–20 | 0.664 | 0.664 | 0.658 |

The invention may be used with fuel cell stacks that do not have water transport plates. The invention may, in some cases, be limited to flowing a water absorbing gas only through the fuel flow fields of the stack or only through the air flow fields of the stack. In a fuel cell stack with water transport plates, the water absorbing gas may be flowed through all or less than all of the flow fields.

Figure 3:
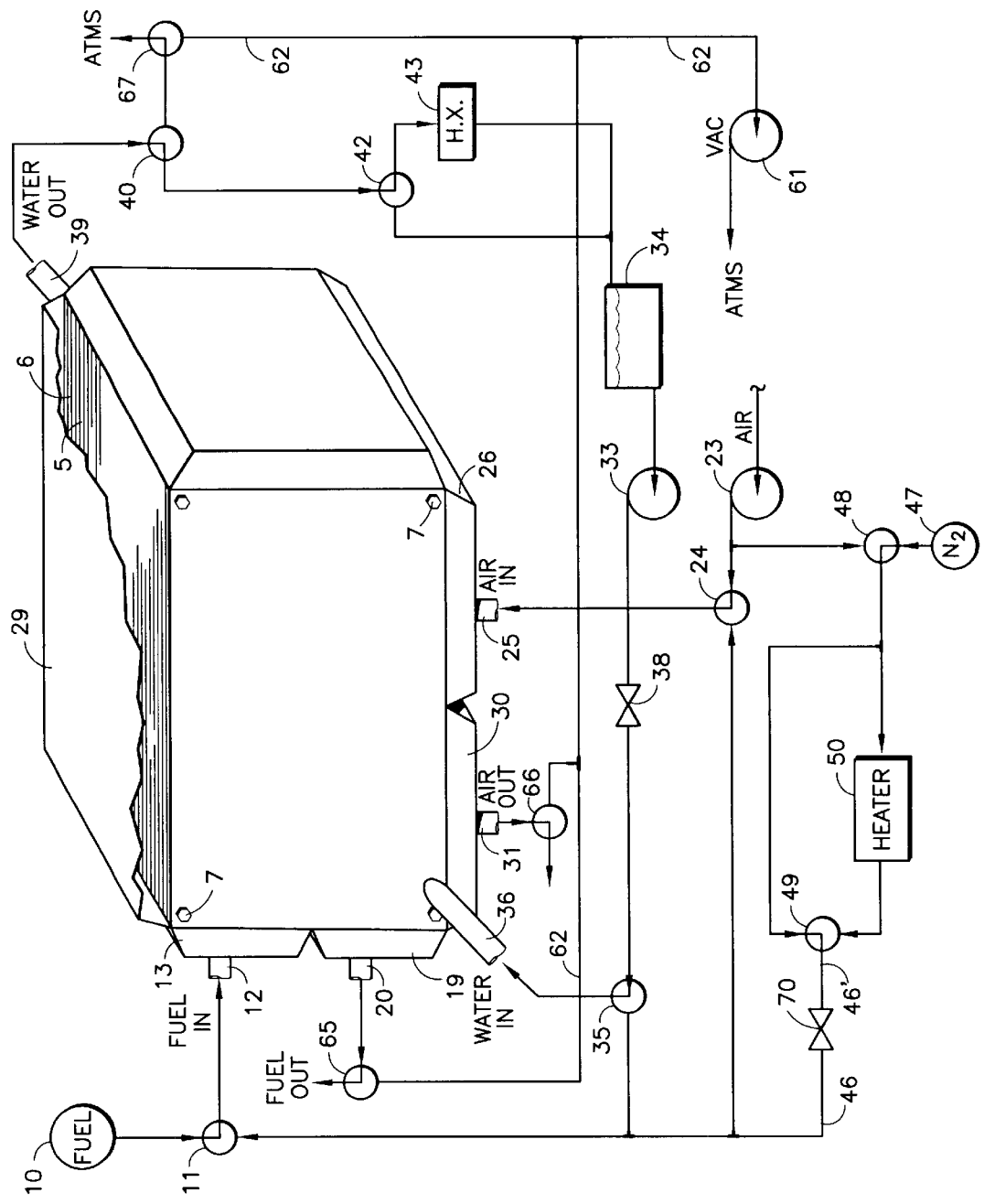
FIG. 3 is a simplified perspective view of a fuel cell with apparatus for normal operation and for recovering performance in accordance with second and third aspects of the present invention.

In accordance with a second aspect of the invention illustrated in FIG. 3, a vacuum pump 61 is connected by a line 62 to a plurality of valves 65–67 at the fuel outlet 20, the air outlet 31, and at the outlet of valve 40 at the water outlet 39. With the valves 11, 24, 35 and 40 rotated a quarter turn from their present position, as described hereinbefore with respect to FIG. 1, so as to connect the fuel, water and air inlets to the line 46, and to vent the water outlet, and with the valves 65–67 in the position shown in FIG. 3, the system will operate as described hereinbefore with respect to FIG. 1. On the other hand, if the valves 65–67 are rotated a quarter turn so as to connect the fuel outlet 20, the air outlet 31 and the water outlet 39 to the vacuum line 62, and the vacuum pump 61 is operated, the flow fields within the fuel cell stack 4 will all be evacuated to some degree, depending upon the nature of the vacuum pump 61 and the setting of a valve 70. The valve 70 is provided so as to connect the line 46 to the valve 49 through a line 46', thereby to regulate the amount of flow to the flow fields; if the valve is closed, the flow fields can be evacuated by the pump 61 to whatever degree it is capable of; by opening the valve 70 slightly, a substantial amount of water will be evaporated into the air or nitrogen because of the very low pressure, and exhausted from the flow fields through the vacuum pump 61, thereby removing the water from the fuel cell stack 4.

In further accord with the invention, one or more of the flow fields may be evacuated, perhaps with the valve 70 closed entirely, thereby to create a maximum amount of evaporation of water into the gas within the flow fields, after which the water-containing gas can be removed from the fuel cell by opening the valve 70 some amount, and supplying either ambient or heated air or nitrogen to the flow fields, to carry out the water-containing gas.

The aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of recovering performance of a proton exchange membrane fuel cell stack in which each fuel cell of the stack has a fuel flow field and an air flow field, said method comprising:

measuring the resistance of the fuel cells; and thereafter while measuring the resistance of the fuel cells, flowing a water absorbing gas through at least one of the fuel flow fields, the air flow fields until the resistance of the fuel cells has increased at least fivefold over the resistance of the fuel cells.

2. A method according to claim 1 wherein:

said gas is air.

3. A method according to claim 1 wherein:

said gas is nitrogen.

4. A method according to claim 1 wherein:

said gas is at room or ambient temperature.

5. A method according to claim 1 wherein:

said gas is heated.

6. A method according to claim 1 wherein:

said gas is heated to about 100° C.

7. A method according to claim 1, comprising:

flowing said water absorbing gas through said fuel flow fields and said air flow fields.

8. A method of recovering performance of a proton exchange membrane fuel cell stack in which each fuel cell of the stack has a fuel flow field, an air flow field, and at least one water management flow field, said method comprising:

measuring the resistance of the fuel cells; and thereafter while measuring the resistance of the fuel cells, flowing a water absorbing gas through at least one of the fuel flow fields, the air flow fields, and the water management flow fields until the resistance of the fuel cells has increased at least fivefold over the resistance of the fuel cells.

9. A method according to claim 8 wherein:

said gas is air.

10. A method according to claim 8 wherein:

said gas is nitrogen.

11. A method according to claim 8 wherein:

said gas is at room or ambient temperature.

12. A method according to claim 8 wherein:

said gas is heated.

13. A method according to claim 8 wherein:

said gas is heated to about 100° C.

14. A method according to claim 8, comprising:

flowing said water absorbing gas through said fuel flow fields, said air flow fields, and said water flow fields.

15. A method of recovering performance of a proton exchange membrane fuel cell stack in which each fuel cell of the stack has a fuel flow field and an air flow field, said method comprising:

measuring the resistance of the fuel cells; and thereafter while measuring the resistance of the fuel cells, evacuating at least one of (a) the fuel flow fields and (b) the air flow fields until the resistance of the fuel cells has increased at least fivefold over the resistance of the fuel cells.

16. A method of recovering performance of a proton exchange membrane fuel cell stack in which each fuel cell of the stack has a fuel flow field, an air flow field, and at least one water management flow field, said method comprising:

measuring the resistance of the fuel cells; and thereafter while measuring the resistance of the fuel cells, evacuating at least one of (a) the fuel flow fields, (b) the air flow fields, and (c) the water management flow fields until the resistance of the fuel cells has increased at least fivefold over the resistance of the fuel cells.

17. A method of recovering performance of a proton exchange membrane fuel cell stack in which each fuel cell of the stack has a fuel flow field and an air flow field, said method comprising:

measuring the resistance of the fuel cells; and thereafter while measuring the resistance of the fuel cells, evacuating at least one of (a) the fuel flow fields and (b) the air flow fields and flowing a limited amount of a water absorbing gas through any evacuated flow field until the resistance of the fuel cells has increased at least fivefold over the resistance of the fuel cells.

18. A method of recovering performance of a proton exchange membrane fuel cell stack in which each fuel cell of the stack has a fuel flow field, an air flow field, and at least one water management flow field, said method comprising:

measuring the resistance of the fuel cells; and thereafter while measuring the resistance of the fuel cells, evacuating at least one of (a) the fuel flow fields, (b) the air flow fields, and (c) the water management flow fields and flowing a limited amount of a water absorbing gas through any evacuated flow field until the resistance of the fuel cells has increased at least fivefold over the resistance of the fuel cells.

* * * * *